United States Patent
Clary

(10) Patent No.: US 6,634,849 B2
(45) Date of Patent: Oct. 21, 2003

(54) MOTORCYCLE LOADING AND UNLOADING DEVICE

(76) Inventor: Charles Clary, 292 Deer Park Hotel Rd., Oakland, MD (US) 21550

( * ) Notice: Subject to any disclaimer, the term of this patent is extended or adjusted under 35 U.S.C. 154(b) by 0 days.

(21) Appl. No.: 09/908,030

(22) Filed: Jul. 18, 2001

(65) Prior Publication Data

US 2002/0051703 A1 May 2, 2002

Related U.S. Application Data

(60) Provisional application No. 60/218,864, filed on Jul. 18, 2000.

(51) Int. Cl.[7] .................................................. B60P 1/43
(52) U.S. Cl. ...................... 414/538; 414/500; 414/813
(58) Field of Search .................... 414/500, 537, 414/538, 813; 296/61

(56) References Cited

U.S. PATENT DOCUMENTS

| 3,025,985 | A |   | 3/1962  | Crawford ................... 214/505 |
|-----------|---|---|---------|-------------------------------------|
| 3,458,073 | A | * | 7/1969  | Dawson                              |
| 3,510,015 | A |   | 5/1970  | Roshaven ..................... 214/85 |
| 3,517,791 | A |   | 6/1970  | Miles ......................... 193/41 |
| 3,667,728 | A | * | 6/1972  | Garelick                            |
| 3,687,314 | A | * | 8/1972  | Haugland .................. 414/522 |
| 4,668,002 | A |   | 5/1987  | Hanson ....................... 296/61 |
| D316,771  | S |   | 5/1991  | Murray ...................... D34/32 |
| 5,234,307 | A |   | 8/1993  | Scott ......................... 414/467 |
| 5,249,910 | A |   | 10/1993 | Ball ........................... 414/538 |
| 5,362,195 | A |   | 11/1994 | Wagner ...................... 414/483 |
| D354,603  | S |   | 1/1995  | Bullard ...................... D34/32 |
| 5,380,141 | A | * | 1/1995  | Flowers ...................... 224/310 |
| 5,538,308 | A |   | 7/1996  | Floe ............................ 296/61 |
| 5,634,228 | A | * | 6/1997  | Johnston ..................... 14/69.5 |
| 5,649,803 | A | * | 7/1997  | Bennett ...................... 414/537 |
| 5,730,577 | A | * | 3/1998  | Jones ......................... 414/462 |
| D398,129  | S |   | 9/1998  | Sacks et al. ................. D34/32 |
| 5,839,875 | A | * | 11/1998 | Miller et al. ................ 224/924 |
| 5,846,047 | A | * | 12/1998 | Riekki ........................ 280/402 |
| 5,934,863 | A |   | 8/1999  | Beck .......................... 414/538 |
| 5,938,397 | A |   | 8/1999  | Schouest ..................... 414/537 |
| 5,971,465 | A |   | 10/1999 | Ives et al. .................... 296/61 |
| 6,059,344 | A |   | 5/2000  | Radosevich .................. 296/61 |
| 6,089,816 | A | * | 7/2000  | Christ ......................... 414/500 |
| 6,120,234 | A | * | 9/2000  | Dinverno .................... 14/71.1 |
| 6,176,672 | B1 | * | 1/2001 | Egan et al. ................. 414/462 |
| 6,524,056 | B1 | * | 2/2003 | Kloster ....................... 414/538 |

OTHER PUBLICATIONS

Merchandise Catalog, A.W. Direct, p. 126 and cover, 2000–2001 (TPW01).

* cited by examiner

*Primary Examiner*—James W. Keenan
(74) *Attorney, Agent, or Firm*—Marshall, Gerstein & Borun LLP

(57) ABSTRACT

A device for loading and unloading a motorcycle onto and from a transport surface of a vehicle includes a dolly assembly that has a plurality of spaced apart wheels. The wheels carry a frame structure that is adapted to support a front wheel of the motorcycle. The device also has a ramp assembly with a pivotable section. The ramp assembly has a loading surface, a first end disposed near the transport surface, and an opposite second end. The pivotable section can be pivoted about the first end so that the second end can be selectively raised and lowered. The device also has a winch mounted on a part of the vehicle. The winch is operable to selectively load and unload the dolly assembly and motorcycle along the loading surface between a ground surface and the transport surface. The pivotable ramp section can be pivoted as the motorcycle and dolly transfer between the ramp assembly and the transport surface to prevent the motorcycle from bottoming out while transferring.

36 Claims, 7 Drawing Sheets

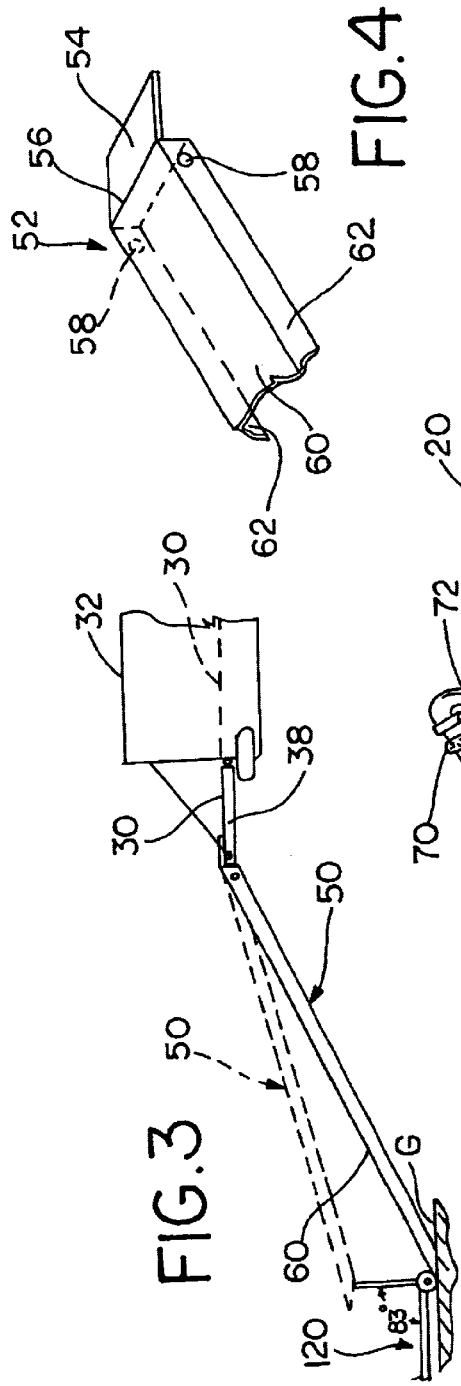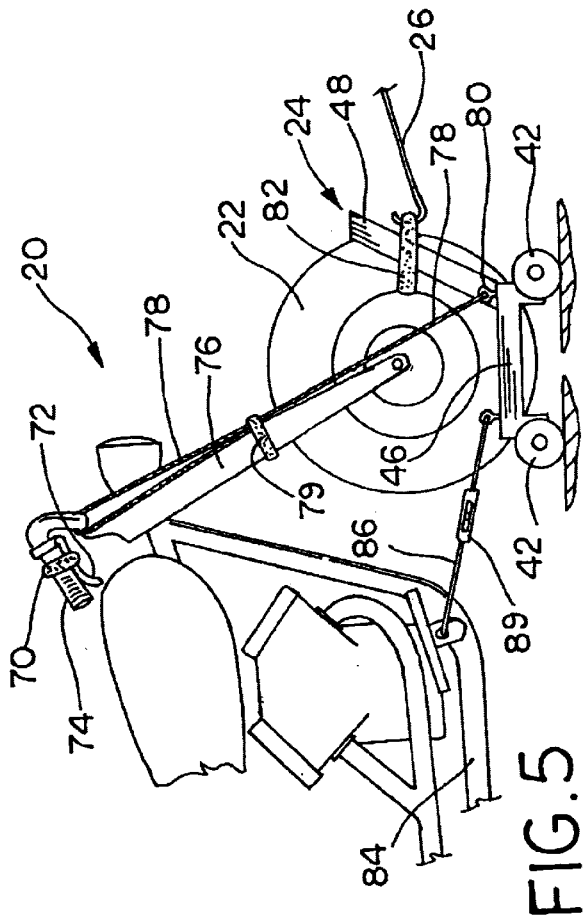

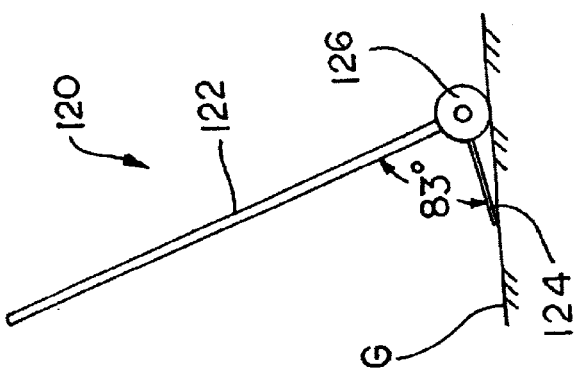
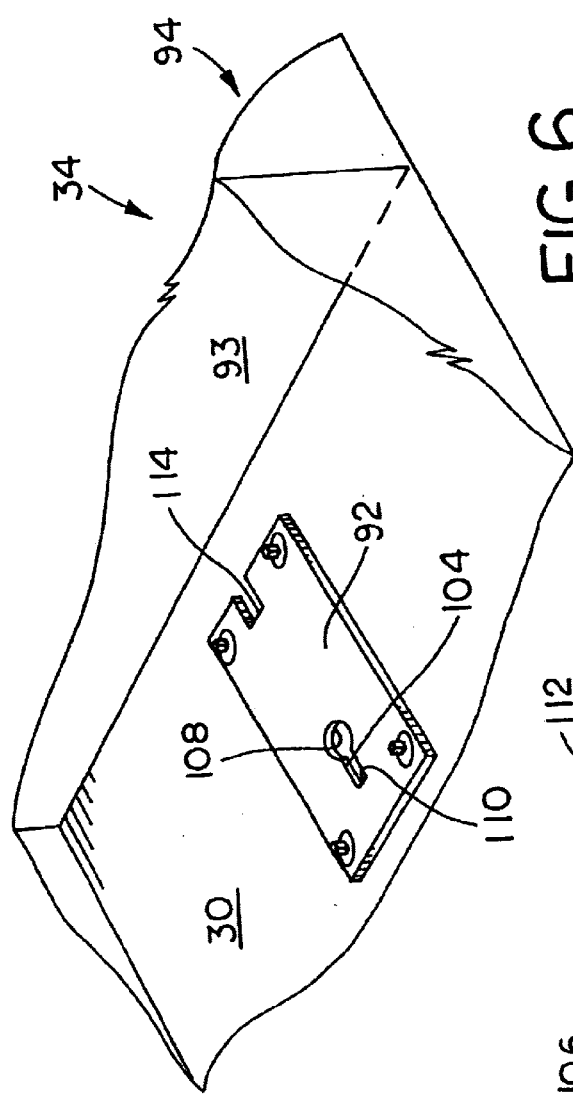
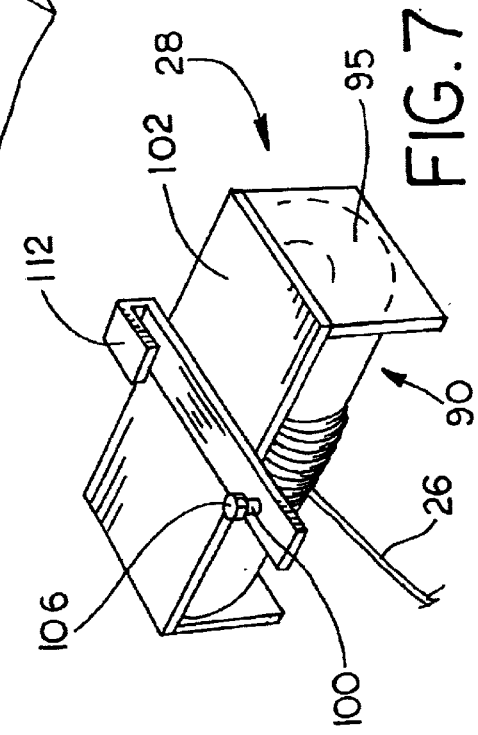

MOTORCYCLE LOADING AND UNLOADING DEVICE

RELATED APPLICATION DATA

This patent is related to U.S. provisional patent application Serial No. 60/218,864, which was filed on Jul. 18, 2000.

BACKGROUND OF THE INVENTION

1. Field of the Invention

The present invention relates generally to motorcycle loadings and unloading devices, and more particularly to a device for loading and unloading a motorcycle from a transport surface of a vehicle.

2. Description of the Related Art

Motorcycles are frequently transported by truck or trailer from one location to another instead of the motorcycle being driven between locations. Motorcycle owners often transport the cycle in the bed of a pick-up truck or a trailer with a transport surface. The most difficult aspects of this mode of transporting a motorcycle are in loading the motorcycle onto the bed and in unloading the cycle from the bed. The owner of the motorcycle is often the only individual present when loading and unloading takes place, making this mode of transportation even more difficult.

A typical pick-up truck has a tailgate that must be lowered to provide uninhibited access to the truck bed. Some transport trailers also have tailgates while others do not. One simple method used by many motorcycle owners is to rest one end of a single ramp on either the edge of the tailgate or the elevated bed surface with the opposite end of the ramp on the ground. The cycle is then driven up or down the ramp to load or unload the cycle from the bed. This can be dangerous for several reasons. The ramp may become easily dislodged from the tailgate or bed during loading or unloading. Also, the driver may either tip the bike over while maneuvering on the ramp or accidentally drive the motorcycle off the edge of the ramp. In each case, injury to the driver or damage to the bike often results. Alternatively, the cycle can be pushed up or down the ramp by one or more individuals without starting the engine in order to load or unload the cycle. However, most motorcycles are relatively heavy and cumbersome and are therefore very difficult to maneuver, especially on an inclined surface, when the engine is not running. Injury to the individuals or damage to the motorcycle again often results.

A number of relatively elaborate and expensive devices have been devised for loading and unloading motorcycles that help to avoid the above problems. For example, very elaborate loading or lifting devices are available that can be permanently added to a truck bed that will automatically lift the cycle onto the bed or lower the cycle to the ground. However, the truck bed cannot be used for other purposes once such a device is installed. Less elaborate devices are known that can load and unload cycles and that are not permanently installed in the bed. However, these devices typically take up a majority of the truck bed space both when being used to load and unload a motorcycle and when being stored in the truck. These devices also tend to require significant time and expertise to set up, install, use, break down, and store.

SUMMARY OF THE INVENTION

One object of the present invention is to provide a device for loading and unloading a motorcycle from a truck bed that can easily be operated by one or two individuals. Another object of the present invention is to provide such a loading and unloading device that is less expensive to manufacture and easier to install than prior known devices. Yet another object of the present invention is to provide such a loading and unloading device that is easily set up and broken down between uses. A further object of the present invention is to provide such a loading and unloading device that can be easily disassembled and stored within a pick-up truck or trailer when not in use and yet still permit use of the truck bed for purposes other than storing the motorcycle and/or the loading device. A still further object of the present invention is to provide a loading and unloading device that can automatically lift and lower the motorcycle from the truck bed. Another object of the present invention is to provide a loading and unloading device and method that prevents the motorcycle being loaded from tipping over or falling off a loading ramp during the loading or unloading process.

These and other objects, features, and advantages of the present invention will become apparent upon a review of the detailed description and accompanying drawings. Though particular embodiments of the present invention are disclosed, the invention is not to be so limited. Changes and modifications can be made to the embodiments disclosed herein and yet fall within the scope and spirit of the present invention.

BRIEF DESCRIPTION OF THE DRAWINGS

FIG. 3 illustrates a side view of the ramp assembly of the device shown in FIG. 1 installed on the pick-up truck;

FIG. 4 illustrates an enlarged perspective view of an upper end of one of the pair of flanking ramp sections of the device shown in FIG. 1;

FIG. 5 illustrates an enlarged side view of the motorcycle front wheel installed on the dolly of the device shown in FIG. 1;

FIG. 6 illustrates a perspective view of a portion of the truck bed showing the winch mounting bracket of the device shown in FIG. 1;

FIG. 7 illustrates a bottom perspective view of the winch of the device shown in FIG. 1;

FIG. 8 illustrates a side view of one embodiment of a lever for lifting the center ramp as shown in FIGS. 3 and 11;

DETAILED DESCRIPTION OF THE PREFERRED EMBODIMENTS

A motorcycle loading and unloading device constructed in accordance with the teachings of the present invention is disclosed herein. The disclosed loading and unloading device generally includes a front wheel dolly assembly, a ramp assembly, and a winch assembly. The device is intended for use with a vehicle having an elevated bed floor or transport surface. The disclosed device assists in raising a motorcycle from the ground onto the vehicle bed and in lowering the cycle from the vehicle bed to the ground. The device is durable and sturdy, is easy to assemble and break down, is easy to use, and is easy to store within the vehicle when not in use while still permitting substantial access to the vehicle bed.

Figure 1:
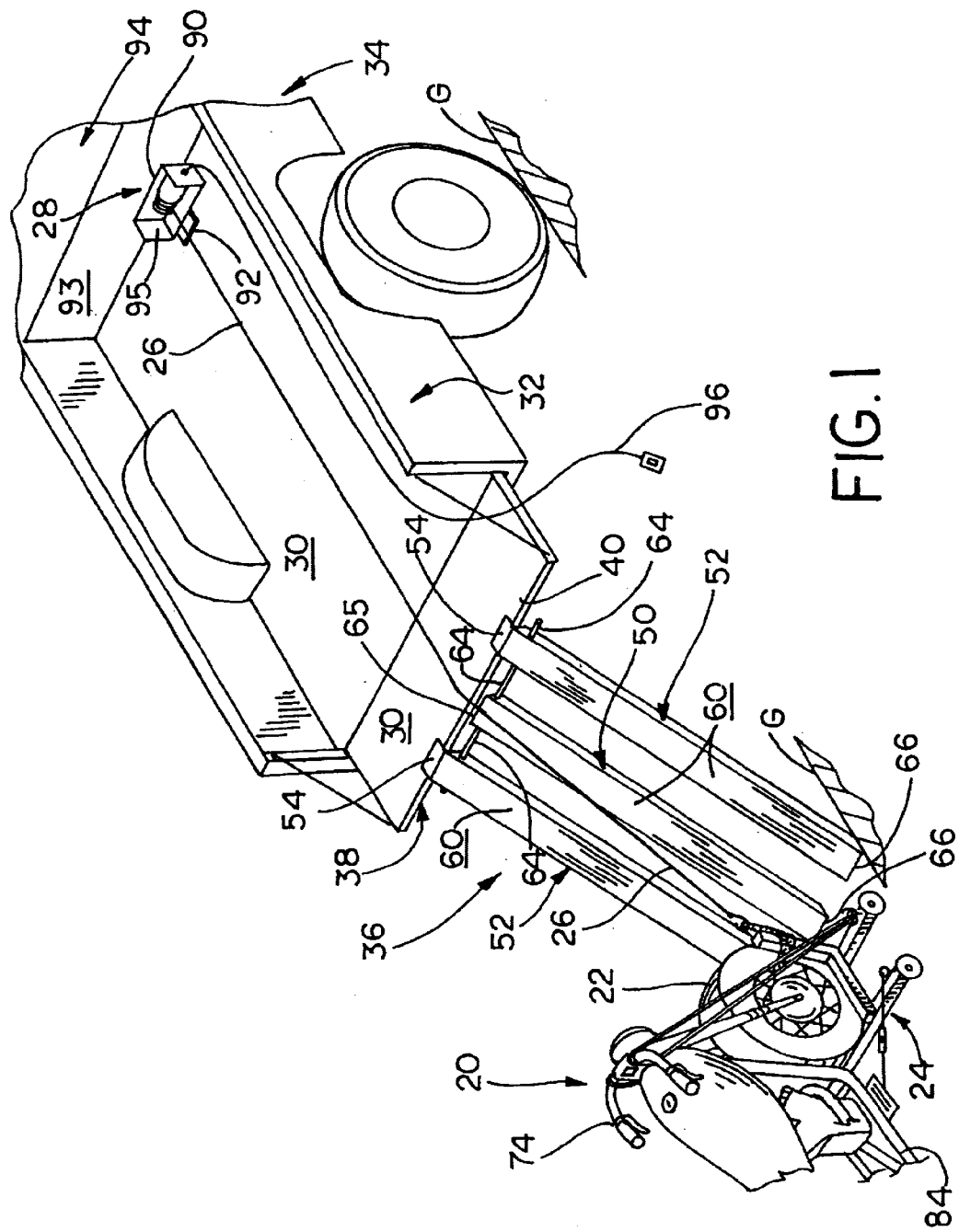
FIG. 1 illustrates a perspective view of a motorcycle loading and unloading device constructed in accordance with one embodiment of the present invention and installed on a pick-up truck.

Referring now to the drawings, FIG. 1 illustrates a motorcycle 20 with its front wheel 22 supported by a dolly assembly 24 of the device of the invention. The dolly 24 is coupled to a winch cable 26 that extends to a winch assembly 28 mounted to a transport surface 30 of a bed 32 of a truck 34. A ramp assembly 36 is generally supported at a first end on a tailgate 38 that is resting in a lowered position. A second end of the ramp assembly 36 rests on the ground G. The ramp assembly components could also rest directly on an edge 40 of the transport surface 30 or other vehicle support surface as needed.

Figure 2:
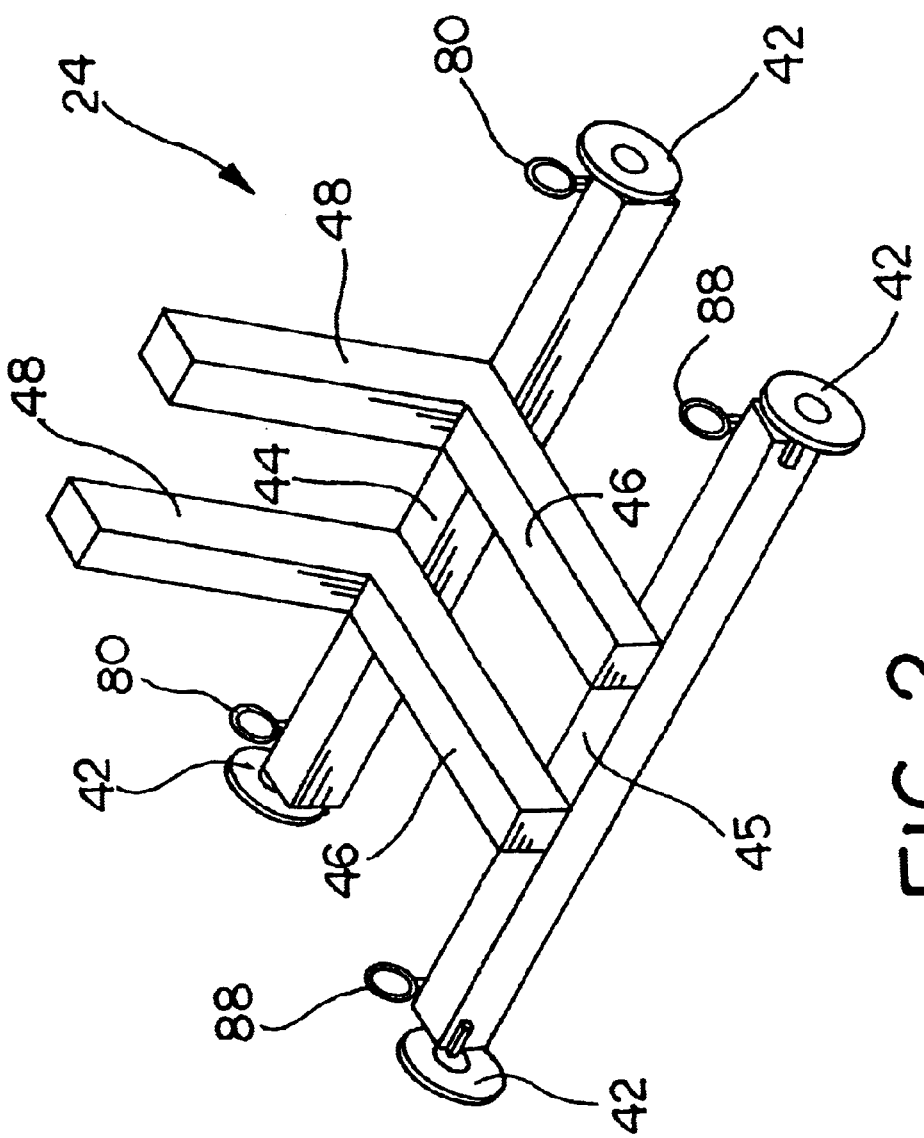
FIG. 2 illustrates a perspective view of the front wheel dolly of the device shown in FIG. 1.

FIG. 2 illustrates a perspective view of the dolly assembly 24 which has a substantially rigid frame structure for supporting a wheel of the motorcycle 20. In one example, the frame structure has a first pair and a second pair of wheels 42 each supported on respective opposite ends of a pair of spaced apart and parallel transverse beams 44 (front) and 45 (rear). The transverse beams 44 and 45 extend between and interconnect a pair of parallel and spaced apart frame segments 46 arranged generally perpendicular to the beams. The wheels 42 are mounted to the beams 44 and 45 so that they are free to rotate about an axle shaft (not shown). Each of the frame segments 46 is securely attached to the beams 44 and 45 in a suitable manner to provide a substantially rigid structure capable of supporting the weight of a front portion of the motorcycle 20.

A pair of upstanding spaced apart and parallel supports 48 extend upward and forward from the front beam 44. The supports 48 can either be an integral part of the frame elements that are bent or curved upward, or be separate elements secured in a suitable manner to the front beam 44.

As will be evident to those of ordinary skill in the art, the dolly assembly 24 can be manufactured from virtually any material strong enough to support the motorcycle front wheel and front end. The dolly assembly 24 can also be a welded structure, a multi-component structure fastened together using various fasteners, a molded and bonded composite structure, or the like. Each of the components such as the beams 44 and 45, frame segments 46, and supports 48 can have a square or rectangular cross section, a round tubular cross section or any other suitable cross section. The dolly assembly 24 need not take the precise geometric form as shown in FIG. 2, but can alternatively have curved components and/or different component arrangements and still fall within the scope of the present invention.

FIG. 3 shows a side view of the ramp assembly 36 as installed on the truck tailgate 38. The tailgate is in the lowered position generally parallel to the ground surface G on which the truck 34 rests. The ramp assembly 36 has a center ramp section 50 disposed between a pair of flanking ramp sections 52. The flanking ramp sections 52, as shown in FIGS. 3 and 4, each have an angled extension 54 projecting from the respective first ends 56 of the sections. Each extension 54 is received over and rests against the tailgate when installed. Each of the center and flanking ramp sections 50 and 52 also has a bar receiving opening 58 formed laterally relative to a loading surface 60 of the ramp sections 50 and 52. The bar receiving openings 58 can be formed through depending structural walls 62 of each ramp section that extend downward parallel to the respective loading surfaces 60 as shown in FIG. 4. Alternatively, each ramp section 50 and 52 can be a planar structure having a bottom surface carrying one or more bar receiving loops or bearings (not shown) that define the openings. A pivot bar 64 is received through each of the openings 58 in each ramp section. As shown in FIG. 1, a first end 65 of the center ramp section 50 is supported solely on the pivot bar 64. A second end 66 of each ramp section rests on the ground G such that the loading surface 60 of each section is inclined for loading and unloading a motorcycle from the truck bed 32. As shown in FIG. 3, the second end 66 of the center ramp section 50 can be pivoted upward from the ground G about the pivot bar 64 to assist in loading and unloading the motorcycle 20 as described in greater detail below.

FIG. 5 shows the motorcycle 20 mounted to the front wheel dolly assembly 24. The front wheel 22 of the bike is rested between the frame segments 46, the upstanding supports 48, and the beams 44 and 45. The dolly components are spaced from one another to assure that the front wheel 22 is fully supported by the dolly assembly 24 without the wheel touching the ground G between the components.

To safely secure the front wheel 22 to the dolly assembly 24, a number of straps are employed and a number of mounting steps can be performed. A brake securing strap 70 can be used to hold the front brake of the motorcycle 20 in an applied condition. To do so, a front brake lever 72 is actuated at the handle bar 74 and then the brake strap 70 is wrapped around the lever 72 to hold the brake in the applied condition. The brake strap 70 can simply be a strong elastic band wrapped several times around the brake lever 72 and handle bar 74 or can be any other type of suitable strap or the like.

The front wheel suspension fork 76 can also be compressed to increase the stability of the bike mounted to the dolly. A pair of compression straps 78 are each preferably connected at one end to each side of the handle bars 74 and at an opposite end to part of the dolly assembly 24. The pair of compression straps 78 are then tightened to draw the handle bars 74 downward compressing the suspension fork 76. The pair of compression straps 78 again can vary considerably, but in one embodiment are each an adjustable belt having a ratchet-type adjustable turnbuckle 79 or come-along that permits incremental tightening of each strap after installation. As shown in FIG. 2, the dolly assembly 24 can include suitable attachment hooks or loops 80 on either side of the upstanding supports 48 for connecting to the fork compression straps 78. Alternatively, the straps 78 can be connected directly to a portion of the front beam 44, an alternative hook arrangement, or any other suitable portion of the dolly assembly 24.

The front wheel 22 can then be secured to the upstanding supports by one or more wheel straps 82 wrapped tightly around both the wheel and the supports 48. Again, each wheel strap 82 can simply be a strap wrapped several times and tied around the front wheel 22,or can be a belt having an adjustable buckle, a ratchet-type turnbuckle, or a come-along that can be adjusted and tightened as needed.

A portion of a frame 84 can also be secured to the dolly in some manner to further stabilize the motorcycle 20 when mounted to the dolly assembly 24. For example, additional frame straps 86 can be wrapped around a potion of the lower bike frame 84, the foot pegs (not shown), or another fixed portion of the bike. These additional frame straps 86 can be connected to part of the dolly assembly 24, such as to separate attachments hooks or loops 88 carried by the dolly structure, or directly to portions of the dolly structure. Again, these additional straps 86 can vary in construction as desired, and can include a length adjusting device 89.

FIG. 1 illustrates a perspective view of the winch assembly 28 mounted within the truck bed 32. In one example, the winch assembly 28 includes a winch 90 removably mounted to a support bracket 92 positioned near a forward wall 93 of a cab 94 of the pick-up truck 34. The winch 90 can be mounted to virtually any surface within the truck bed and yet perform its intended function. The winch cable 26 is wrapped around a rotatable body 95 of the winch 90. The winch assembly 28, in one example, can include a hardwired remote control unit 96 that is used to operate the winch from a remote location outside the truck bed 32. The remote control unit can also be a wireless remote, such as one operable by radio frequency (RF) signals. The winch assembly 28 is preferably coupled to the vehicle electrical system (not shown) for providing power to operate the winch 90.

FIG. 7 shows a bottom view of the winch 90 and FIG. 6 shows a top view of the mounting bracket 92 for the winch. FIGS. 6 and 7 illustrate one exemplary construction for providing a removable attachment for the winch 90. The winch 90 can have one or more depending connector studs or pins 100 extending from a bottom surface 102 of the winch body 95. The mounting bracket 92 can include a corresponding number of complimentary openings 104 for receiving the connector pins therein. In one example as shown, the connector pin 100 has a larger diameter shoulder 106 on a distal end of the pin. The complimentary opening 104 is a keyhole shaped slot with a wider end 108 for receiving the pin 100 and shoulder 106 and a narrower end 110. The slot is oriented such that, when installed, cable tension pulls the pin toward the narrower end 110. The narrower end 110 prevents the shoulder 106 of a pin 100 from passing back through the slot when the winch 90 is mounted to the bracket 92. Alternatively, the winch 90 can have one or more hooks 112 and the mounting bracket can include one or more complimentary closed end slots (similar to the slot 104) or open ended notches 114, as shown. When installed, the hook or hooks are drawn by cable tension to extend beyond the notch or slot to hold the winch 90 in place. FIGS. 6 and 7 illustrate one pin 100 and slot 104 arrangement and also one hook 112 and notch 114 arrangement by way of example.

As load is applied to the winch cable 26 by the motorcycle 20, the winch pins 100 or hooks 112 are drawn rearwardly into engagement with the corresponding slot narrow ends 108 or notches 116, respectively, securing the winch 90 in place on the mounting bracket 92 when the winch assembly 28 is in use. When not in use, the winch 90 can be removed from the mounting bracket 92 by sliding the winch body 95 forward to disengage the pins 100 or hooks 112 from the corresponding openings in the mounting bracket 92. The winch 90 can then simply be lifted from the bracket and removed from the truck bed.

FIG. 8 illustrates one example of a lift bar 120 for raising the center ramp section 50 as needed. The lift bar 120 has an elongate section 122 and a shorter section 124 that is shorter than the elongate section. The two sections are joined at a juncture and at an angle relative to one another. The angle can vary considerably, and as shown in FIG. 8, can be less than 90°, such as 83° as shown. In one example, the lift bar 120 has one or more wheels or rollers 126 disposed at the juncture between the two bar sections 122 and 124. The shorter section 124 is positioned beneath the center ramp section 50 when needed. With the wheels 126 positioned on the ground G, the elongate section is angled upward. The elongate section 122 is used to lift the center section 50 and the wheels 126 substantially reduce friction between the lift bar 120 and the ground G as described below.

One advantage of the disclosed device is that it is relatively easy to assemble, use, and break down. Another advantage is that the disclosed device is easy to store when not in use and can be stored in the vehicle without taken up much space. When not in use, the dolly assembly 24 can be stored within the truck cab 94, the truck bed 32, or a remote location. The ramp sections 50 and 52 can be separated by removing the pivot bar 64 and then stored within the truck bed 32 or a remote location as well. Because the ramp assembly 36 is formed in three separate sections, the ramp takes up very little space within the truck bed when broken down and stored in the bed. This permits use of the truck bed 32 for other purposes even though the device of the invention is stored in the truck 34. The lift bar 120 can also be easily stored remotely, in the truck bed 32, or in the truck cab 94 as desired and without taking up much space.

The winch 90 can also be removed and stored in the truck cab when not in use. The winch mounting bracket 92 is preferably secured to the forward end of the transport surface or floor 30 of the bed 32 near the cab wall 93. The mounting bracket 92 can be formed nearly flush with the bed floor 30, taking up very little space. Alternatively, the winch 90 can be removably mounted to the rear window frame on the cab wall 93 of the truck cab 94 when used and then stored in the cab when not being used. In such an example, no permanent winch mounting bracket 92 would be needed.

To assemble the device for loading the motorcycle 20, the flanking ramp sections 52 are retrieved and set with the second ends 66 on the ground G and the extensions 54 resting on the opened tailgate or the edge of the bed surface or floor 30. The center ramp section 50 is positioned between the flanking sections with its second end 66 of the ground G. The pivot bar 64 is passed through the bar openings 58 in one flanking ramp section 52, then through the center section 50, and then through the other flanking section. The winch 90, lift bar 120, and dolly assembly 24 are retrieved and the winch is installed in the bed.

FIGS. 1 and 9–12 illustrate the loading and unloading device in use. First, the dolly assembly 24 is positioned under the front wheel 22, the front brake is applied and locked, and the motorcycle 20 is secured to the dolly assembly as described above. The winch cable 26 is then pulled from the winch body 95 and attached to a portion of the dolly assembly 24. This attachment can include a hook or securing device on the cable end and a corresponding eyelet or coupling device on the dolly.

Figure 9:
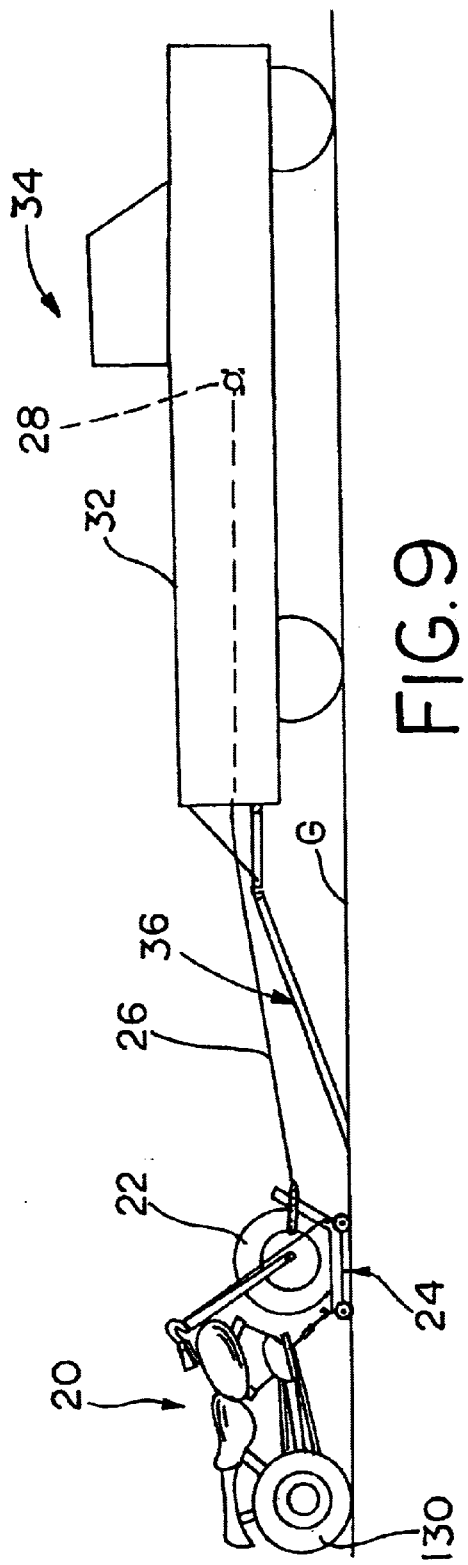
FIG. 9–12 illustrate a succession of views showing the motorcycle as it is raised onto the ramp assembly and into the truck bed or lowered from the truck bed to the ground.
Figure 10:
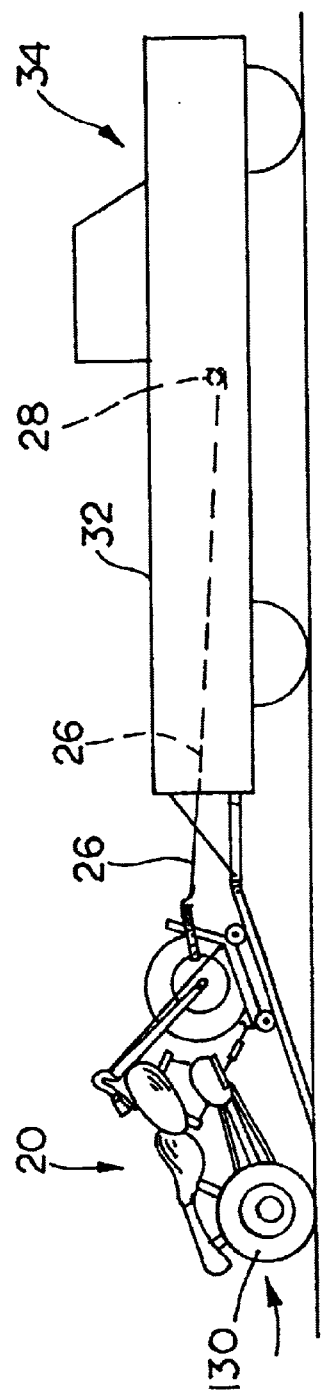

FIGS. 1 and 9 show the motorcycle 20 on the ground G prior to being loaded and after being unloaded. FIG. 10 shows the dolly assembly 24 and motorcycle front wheel 22 resting completely on the ramp assembly 36 during loading or unloading. The wheels 42 of the dolly assembly 24 are aligned with and rest on the loading surfaces 60 of the pair of flanking ramp sections 52. A rear wheel 130 of the motorcycle 20 is aligned with and rests on the loading surface 60 of the center ramp section 50.

Figure 11:
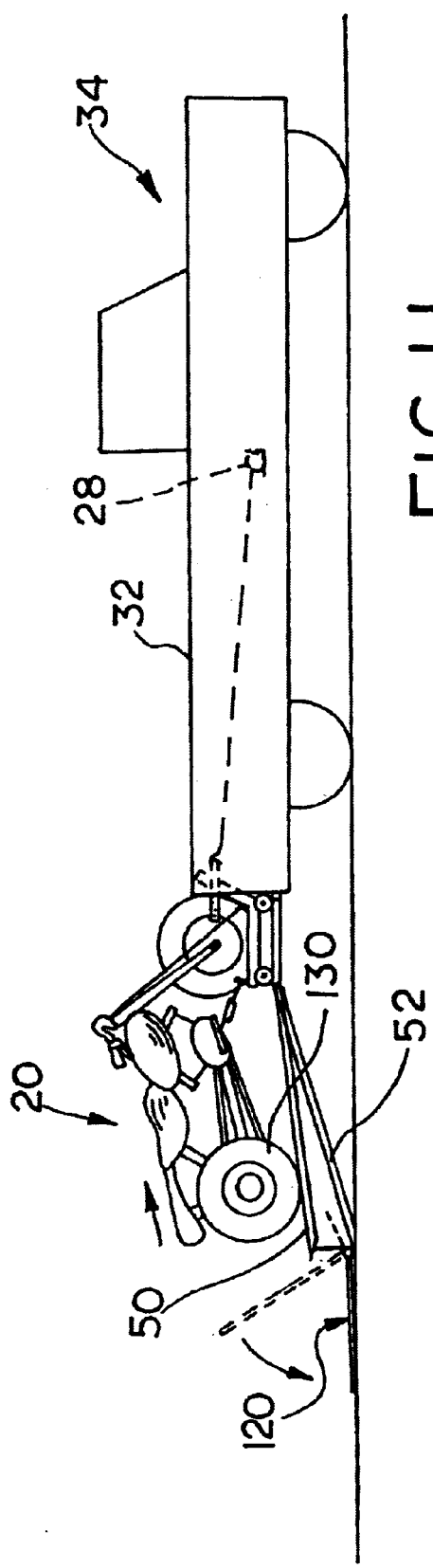

FIG. 11 shows the motorcycle 20 partly on the bed surface or floor 30 and partly on the ramp assembly 36. In this orientation, the second end 66 of the center ramp section 50 can be raised, if needed, using the lift bar 120 to prevent the frame 84 of the motorcycle from bottoming out against the tailgate or the center ramp section. The lift bar 120 of FIG. 8 can be utilized to raise the center ramp by placing the short end 124 under the center section second end 66 and then lowering the longer section 122 toward the ground G. Where no lift bar 120 is available, the center ramp section 50 can alternatively be raised by using an elongate, fairly rigid object such as a board, pipe, or bar. One end of the elongate object is placed under the center ramp and the opposite end can be lifted upward to raise the center section. The elongate object or the lift bar 120 provides increased mechanical advantage so that even one individual can lift the ramp and hence the rear of the bike to level the bike when transferring between the ramp assembly 36 and the bed floor 30. The motorcycle is raised and lowered by operating the winch assembly 28 which retracts or withdraws the winch cable 26 as desired. The winch assembly in this example is operated by the remote control device 96.

Figure 12:
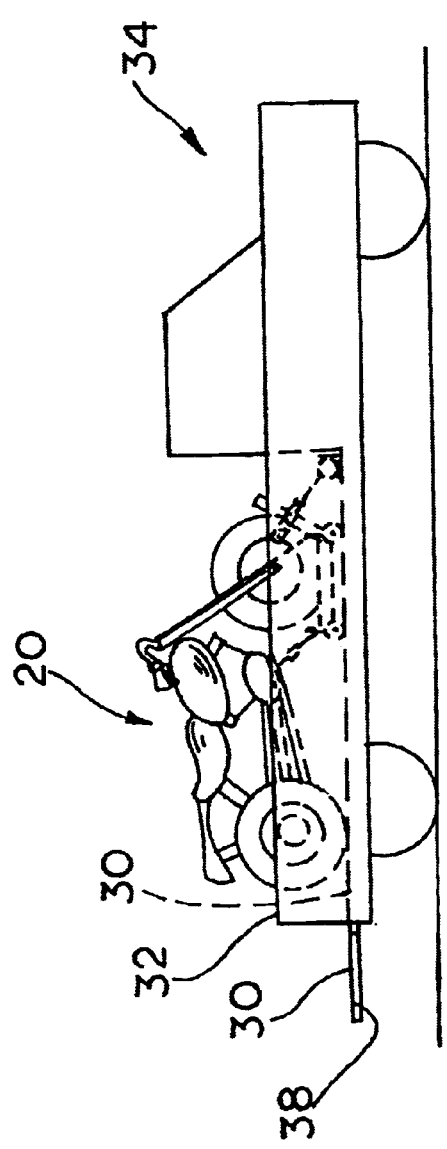

FIG. 12 illustrates the motorcycle 20 resting in the truck bed 32. When the bike is stored and transported in the bed, the secure attachment of the bike to the dolly assembly 24 and the sturdy and stable four wheel construction of the dolly retains the bike in a vertical position. The bike can be safely stored and transported once loaded in the truck bed. One or more additional tie downs and/or locks can be used to stabilize and secure the bike during transport.

As will be evident to those of ordinary skill in the art, the loading and unloading device disclosed herein is suitable for use with pick-up trucks. The device is equally well suited for use with flat bed trucks, open flat bed trailers, enclosed transport trailers, and the like. The disclosed device components can vary from the particular configurations, constructions, and materials set forth herein and yet fall within the scope of the invention.

For example, the dolly assembly 24 can be provided with adjustments for accommodating motorcycles of various sizes. To illustrate, the upstanding wheel supports 48 can be laterally adjustable relative to one another. The transverse front and rear beams 44 and 45 can telescopically adjust in length to selectively alter the gap between the supports 48, as well as the gap between the frame segments 46, if desired. The distance between the beams 44 and 45 can also be adjustable to accommodate various wheel diameters. The frame segments 46 can be telescopically length adjustable to achieve dolly length variation. The telescoping sections can be realizable locked together at a selected length by any suitable means. For example, the two telescoping sections of each adjustable component can each have a plurality of holes which, when selected holes on each section are aligned, receive a locking pin, key, or other fastener through the corresponding holes in each section.

Figure 13:
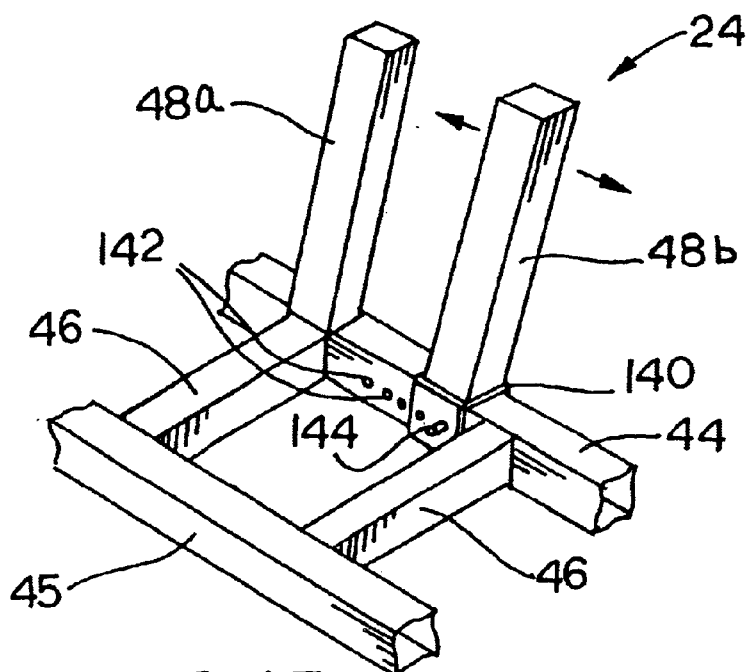
FIG. 13 illustrates an alternative front wheel dolly construction wherein the width is adjustable to accommodate different sized motorcycle wheels.

FIG. 13 illustrates another adjustable dolly arrangement in cross section. The dolly assembly 24 has one upstanding support 48a permanently affixed to a portion of the dolly assembly. The second upstanding support 48b is affixed to a horizontally oriented sleeve 140. The sleeve 140 is telescopically received over the front transverse beam 44 such that it can slide along the beam. A plurality of sets of holes 142 can be provided through each side of both the beam 44 and the sleeve 140. A pin 144 is removably received through a selected set of the holes 142 in both the beam 44 and sleeve 140 to hold the upstanding support 48b in a selected position along the beam. Movement of the upstanding supports 44b relative to the support 48a adjusts the width or spacing between the supports to accommodate different width front wheels.

Figure 14:
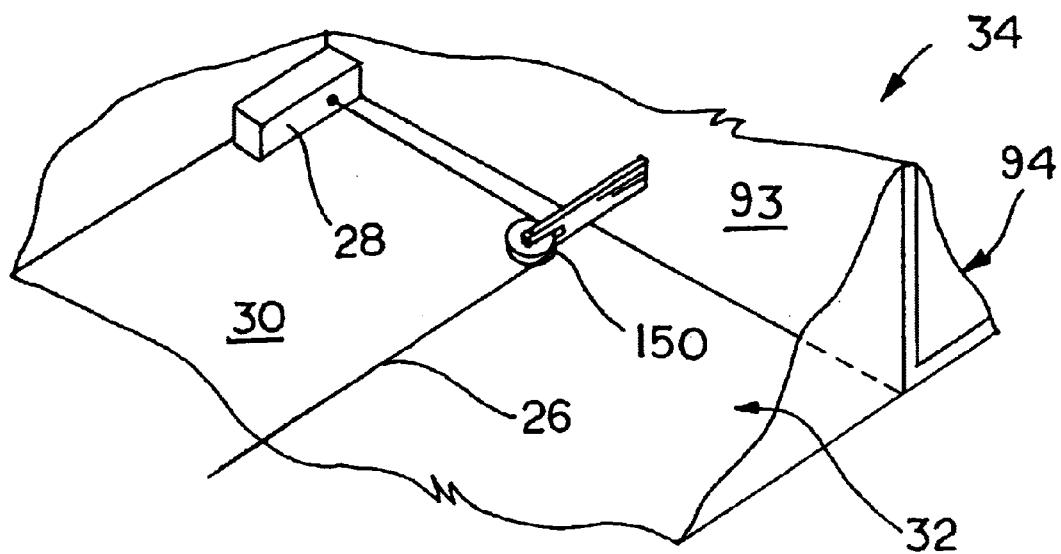
FIG. 14 illustrates an alternative winch mounting arrangement.

As another example, FIG. 14 illustrates an alternative arrangement for mounting the winch assembly 28 in the truck bed 32. In this example, the winch assembly 28 is mounted in a forward corner of the bed 32. The winch cable 26 extends laterally to the center of the bed wherein it is redirected around a pulley 150. The cable 26 then extends as before toward the rear of the bed 32. In this example, the pulley 150 and winch assembly 28 can each be mounted directly to the cab wall 93 or the bed 32, either in a removable or a permanent manner. Alternatively, the pulley 150 can be mounted to the center of a mounting plate 152 carried at the forward end of the bed 32 adjacent the cab wall 93. The winch assembly 28 can be mounted to one end of the mounting plate 152 as well. Both the pulley 150 and winch assembly 28 can be removably or permanently mounted to the plate 152. In addition, the mounting plate 152 can be affixed to or removably mounted to the bed 32 or cab wall 93.

Other changes and modifications can be made to the loading and unloading device as described herein without departing from the spirit and scope of the present invention. Such changes and modifications are intended to fall within the scope of the invention and are intended to constitute equivalent embodiments of the invention.

What is claimed is:

1. A device for loading and unloading a motorcycle onto and from a transport surface of a vehicle, the device comprising:

a dolly assembly having a plurality of spaced apart wheels carrying a frame structure for supporting a first wheel of the motorcycle;

a ramp assembly having a loading surface, the ramp assembly having a center ramp section, a pair of flanking ramp sections, each having a first end adapted to rest on an edge of the transport surface of the vehicle and an opposite second end adapted to rest on a ground surface, and a pivot bar removably suspended between the two flanking ramp sections near their respective first ends, the center ramp section having a first end and an opposite second end, the first end of the center ramp section pivotally supported by the pivot bar so that its second end can be selectively raised and lowered independent of the pair of flanking sections; and a winch mounted on a part of the vehicle and operable to selectively raise and lower the dolly assembly and motorcycle along the loading surface between a ground surface and the transport surface.

2. A device according to claim 1, wherein the dolly assembly wheels roll along the loading surface of the flanking ramp sections and a second wheel of the motorcycle rolls along the loading surface of the center ramp section when loading and unloading the motorcycle.

3. A device according to claim 1, further comprising:

a lift bar adapted to manually raise and lower the second end of the center ramp section while providing a mechanical advantage.

4. A device according to claim 3, wherein to the lift bar further comprises:

a short section adapted for raising the second opposite end of the center ramp section;

an elongate section coupled to and extending from the short section and oriented at an angle relative to the short section; and at least one roller disposed at a juncture between the elongate and short sections and adapted for supporting the lift bar on the ground surface.

5. A device according to claim 1, further comprising:

a winch mounting bracket carried on a portion of the vehicle for removably mounting the winch on the vehicle.

6. A device according to claim 5, wherein the winch includes at least one latching element extending therefrom, and wherein the winch mounting bracket includes at least one elongate opening for removably receiving the latching element therein, the latching element slidable along the elongate opening in one direction to secure the winch to the mounting bracket and slidable in another direction to release the winch from the mounting bracket.

7. A device according to claim 1, wherein the dolly assembly frame structure further comprises:
   a pair of spaced apart transverse beams;
   a pair of spaced apart longitudinal frame segments interconnected by the pair of transverse beams; and
   a pair of spaced apart upstanding supports extending upward from part of the frame structure.

8. A device according to claim 7, wherein the pair of upstanding supports extend upward from a forward one of the pair of transverse beams.

9. A device according to claim 7, wherein the dolly assembly further comprises:
   a pair of wheels carried near each of the longitudinal frame segments.

10. A device according to claim 7, wherein at least a gap between the upstanding supports can be selectively adjusted to accommodate different sized wheels.

11. A device according to claim 1, further comprising:
   a front wheel brake application strap attachable to a hand grip of the motorcycle for applying a front brake of the motorcycle;
   at least one front wheel suspension fork compression strap attachable to a front wheel of the motorcycle for compression of a front suspension fork of the motorcycle; and
   at least one front wheel tie down strap attachable to the front wheel and to the dolly for securing the front wheel to the dolly.

12. A device according to claim 1, wherein the winch is mounted near a side edge of the transport surface and has a winch cable that extends from the winch toward a middle region of the transport surface, that extends around a pulley, that is directed toward a rear edge of the transport surface, and that can be removably coupled to a portion of the dolly assembly.

13. A device according to claim 1, further comprising:
   a remote control unit for operating the winch at a desired distance from the winch.

14. A method of loading and unloading a motorcycle onto and from a transport surface of a vehicle, the method comprising the steps of:
   placing respective first ends of a pair of flanking ramp sections spaced apart on an edge of the transport surface and respective second ends of the pair of flanking sections on a ground surface;
   pivotally supporting a first end of a pivotable ramp section between the pair of flanking sections at least near the transport surface such that an opposite second end can be raised and lowered independent of the pair of flanking sections about the first end of the pivotable ramp section;
   supporting a first wheel of the motorcycle on a dolly assembly;
   positioning the motorcycle in alignment with the pivotable ramp section;
   connecting a winch cable of a winch to the dolly assembly;
   operating the winch to load or unload the motorcycle relative to the transport surface along the pivotable ramp section; and
   raising a second opposite end of the pivotable ramp section from the ground surface when the motorcycle is transferring between the transport surface and the ramp assembly to prevent the motorcycle from bottoming out while transferring.

15. A method according to claim 14, further comprising the steps of:
   applying a front brake of the front wheel after the step of supporting; and
   securing the front wheel to the dolly assembly after the step of supporting.

16. A method according to claim 14, wherein the step of raising further comprises:
   placing one end of a lift bar under the second end of the pivotable ramp section; and
   raising the pivotable ramp section by using the lift bar.

17. A method according to claim 14, wherein the step of placing further comprises:
   extending a pivot bar transversely between the pair of flanking ramp sections; and
   supporting the first end of the pivotable ramp section on a pivot bar between the flanking ramp sections.

18. A method according to claim 14, further comprising the step of:
   removably mounting the winch to a mounting bracket carried on a portion of the vehicle near the transport surface.

19. A method according to claim 14, wherein the step of operating further includes using a remote control unit to operate the winch.

20. A method according to claim 14, further comprising the steps of:
   dismantling the pair of flanking ramp sections and the pivotable ramp section from the edge of the transport surface;
   storing the pair of flanking ramp sections and the pivotable ramp section on the transport surface;
   removing the winch; and
   storing the winch in a portion of the vehicle.

21. A kit for loading and unloading a motorcycle onto and from a transport surface of a vehicle, the kit comprising:
   a pair of flanking ramp sections and a pivotable center ramp section, each having an upper loading surface, each of the pair of flanking ramp sections having a first end supportable on an edge of the transport surface and an opposite second end adapted to rest on a ground surface, the pivotable center ramp section having a first end and an opposite second end adapted to rest on a surface, the first end being supported on a removable pivot bar supported between the pair of flanking ramp sections so that its second end can be raised and lowered independent of the pair of flanking ramp sections;
   a dolly assembly having a plurality of spaced apart wheels carrying a frame structure for supporting a first wheel of the motorcycle aligned with the center ramp section, the wheels of the dolly assembly adapted to travel along the loading surface of the flanking ramp sections when in use; and
   a winch removably mountable to a part of the vehicle and being operable to selectively load and unload the dolly assembly and motorcycle between the ground surface and the transport surface along the loading surfaces of the flanking ramp sections and center ramp section, respectively.

22. A kit according to claim 21, further comprising:
a lift bar adapted to manually raise and lower the second end of the center ramp section and to provide a mechanical advantage.

23. A kit according to claim 21, further comprising:
a plurality of straps for securing a front wheel of the motorcycle to the dolly assembly, for compressing a front suspension fork of the motorcycle, and for applying a front brake of the motorcycle.

24. A kit according to claim 21, further comprising
a remote control unit for operating the winch at a desired distance from the winch.

25. A device for loading and unloading a motorcycle onto and from a transport surface of a vehicle, the device comprising:
a dolly assembly having a plurality of spaced apart wheels carrying a frame structure for supporting a front wheel of the motorcycle;
a ramp assembly defining a loading surface and having a center ramp section and a pair of flanking ramp sections, the flanking ramp sections each having a first end adapted to rest on an edge of the transport surface of the vehicle and a second end adapted to rest on a ground surface, the center ramp section having a first end disposed at least near the edge of the transport surface and an opposite second end adapted to rest on the ground surface,;
a pivot bar removably suspended between the two flanking ramp sections near their respective first ends, whereby the first end of the center ramp section is pivotally supported by the pivot bar so that the second end can be selectively raised and lowered; and
a winch mounted on a part of the vehicle and operable to selectively raise and lower the dolly assembly and motorcycle along the loading surface between the ground surface and the transport surface.

26. A device according to claim 25, wherein the dolly assembly wheels roll along the loading surface of the flanking ramp sections and the motorcycle rolls along the loading surface of the center ramp section when loading and unloading the motorcycle.

27. A device according to claim 25, further comprising:
a lift bar adapted to manually raise and lower the second end of the center ramp section while providing a mechanical advantage.

28. A device according to claim 25, further comprising:
a remote control unit for operating the winch at a desired distance from the winch.

29. A method of loading and unloading a motorcycle onto and from a transport surface of a vehicle, the method comprising the steps of:
resting a pair of flanking ramp sections spaced apart on an edge of the transport surface;
extending a pivot bar transversely between the pair of flanking ramp sections;
pivotally supporting a first end of a pivotable ramp section on the pivot bar between the flanking ramp sections;
supporting a wheel of the motorcycle on a dolly assembly;
positioning the motorcycle in alignment with the pivotable ramp section;
connecting a winch cable of a winch to the dolly assembly;
operating the winch to load or unload the motorcycle relative to the transport surface; and
raising a second opposite end of the pivotable ramp section from a ground surface when the motorcycle is transferring between the transport surface and the pivotable ramp section.

30. A method according to claim 29, comprising the steps of:
supporting a front wheel on the dolly assembly;
applying a front brake of the front wheel after the step of supporting; and
securing the front wheel to the dolly assembly after the step of supporting.

31. A method according to claim 29, the step of raising further comprises:
placing one end of a lift bar under the second end of the pivotable ramp section; and
raising the pivotable ramp section by using the lift bar.

32. A method according to claim 29, wherein the step of operating further includes using a remote control unit to operate the winch.

33. A kit for loading and unloading a motorcycle onto and from a transport surface of a vehicle, the kit comprising:
a pair of flanking ramp sections and a pivotable center ramp section, each having an upper loading surface, and each of the pair of flanking ramp sections having a first end supportable on an edge of the transport surface;
a pivot bar removably suspendable between the two flanking ramp sections near the respective first ends, a first end of the center ramp section being pivotally supportable by the pivot bar such that the center ramp section is pivotable about its first end;
a dolly assembly having a plurality of spaced apart wheels carrying a frame structure for supporting a first wheel of the motorcycle, the wheels of the dolly assembly positioned to travel along the loading surface of the flanking ramp sections and so that a second wheel of the motorcycle can travel along the center ramp section during loading and unloading; and
a winch removably mountable to a part of the vehicle and being operable to selectively load and unload the dolly assembly and motorcycle between a ground surface and the transport surface along the loading surface of the flanking ramp sections and center section.

34. A kit according to claim 33, further comprising:
a lift bar adapted to manually raise and lower the the second end of the center ramp section and to provide a mechanical advantage.

35. A kit according to claim 33, further comprising:
a plurality of straps for securing a front wheel of the motorcycle to the dolly assembly, for compressing a front suspension fork of the motorcycle, and for applying a front brake of the motorcycle.

36. A kit according to claim 33, further comprising
a remote control unit for operating the winch at a desired distance from the winch.

* * * * *

UNITED STATES PATENT AND TRADEMARK OFFICE
CERTIFICATE OF CORRECTION

PATENT NO. : 6,634,849 B2
DATED : October 21, 2003
INVENTOR(S) : Charles Clary

It is certified that error appears in the above-identified patent and that said Letters Patent is hereby corrected as shown below:

Column 8,
Line 54, please delete "wherein to the lift bar" and replace with -- wherein the lift bar --.

Column 10,
Lines 54-55, please delete "an opposite second end adapted to rest on a surface," and replace with -- an opposite second end adapted to rest on a ground surface, --.
Line 56, please delete "removable pivot bar supported" and replace with -- removable pivot bar suspended --.

Column 12,
Line 11, please delete "claim 29, comprising" and replace with -- claim 29, further comprising --.
Line 18, please delete "claim 29, the step" and replace with -- claim 29, wherein the step --.
Line 52, please delete "the the" and replace with -- the --.

Signed and Sealed this

Twenty-second Day of March, 2005

JON W. DUDAS
*Director of the United States Patent and Trademark Office*